Nov. 18, 1969    J. D. MOORE    3,478,888

SUCTION FILTERING MACHINE

Filed Feb. 6, 1967    4 Sheets-Sheet 1

INVENTOR
JOE D. MOORE

BY Robillard and Byrne
ATTORNEYS

Nov. 18, 1969   J. D. MOORE   3,478,888
SUCTION FILTERING MACHINE
Filed Feb. 6, 1967   4 Sheets-Sheet 2

INVENTOR
JOE D. MOORE
BY
ATTORNEYS

Nov. 18, 1969 J. D. MOORE 3,478,888
SUCTION FILTERING MACHINE
Filed Feb. 6, 1967 4 Sheets-Sheet 3

INVENTOR
JOE D. MOORE
BY *Robillard and Beyne*
ATTORNEYS

INVENTOR
JOE D. MOORE

United States Patent Office 3,478,888
Patented Nov. 18, 1969

3,478,888
SUCTION FILTERING MACHINE
Joe D. Moore, 2715 Homewood Drive,
Albany, Ga. 31705
Filed Feb. 6, 1967, Ser. No. 614,124
Int. Cl. B01d 29/02
U.S. Cl. 210—255                         4 Claims

ABSTRACT OF THE DISCLOSURE

A filter apparatus having a continuous web filter clampingly engaged transversely through a container to divide it into upper and lower compartments. The upper comparment receives fluid which has been pre-filtered by a gravity flow through a series of nested trough sections. The lower compartment has a partial vacuum imposed therein by a suction pump and the fluid is filtered through the web from the upper compartment into the lower compartment. The upper compartment is movable out of clamping engagement so that a different portion of the web may be used.

---

This invention relates generally to filtering and more particularly relates to a high capacity suction liquid filtering apparatus.

A primary objective of the invention is to provide a suction filtering apparatus wherein the filter may be changed quickly without any appreciable loss of time by furnishing a continuous web filter which may be sequentially advanced so that successive portions thereof are in an operative, filtering position.

Another objective of this invention is to provide a filtering apparatus where the filter media may be continuously changed and processed for cleaning and reuse by furnishing a continuous web filter wherein a portion thereof is in an operative, filtering position while the remainder thereof is in an inoperative position for cleaning as required.

Another objective of this invention is to provide a filter media for filtering apparatus which can be continuously reused by providing means to process and clean the filter media after use thereof.

It is still another objective of this invention to provide a filtering apparatus which rapidly processes fluid therethrough by providing means to impose a pressure differential across the filter.

A further objective of the invention is to provide a filtering apparatus having a filter tank which has sections on opposite sides of the filter and a container which is closed for atmospheric evacuation and filtrate storage.

Yet a further objective of the invention is to provide a conduit section for prefiltering the fluid before it reaches the filter apparatus' fluid tank.

Figure 1:
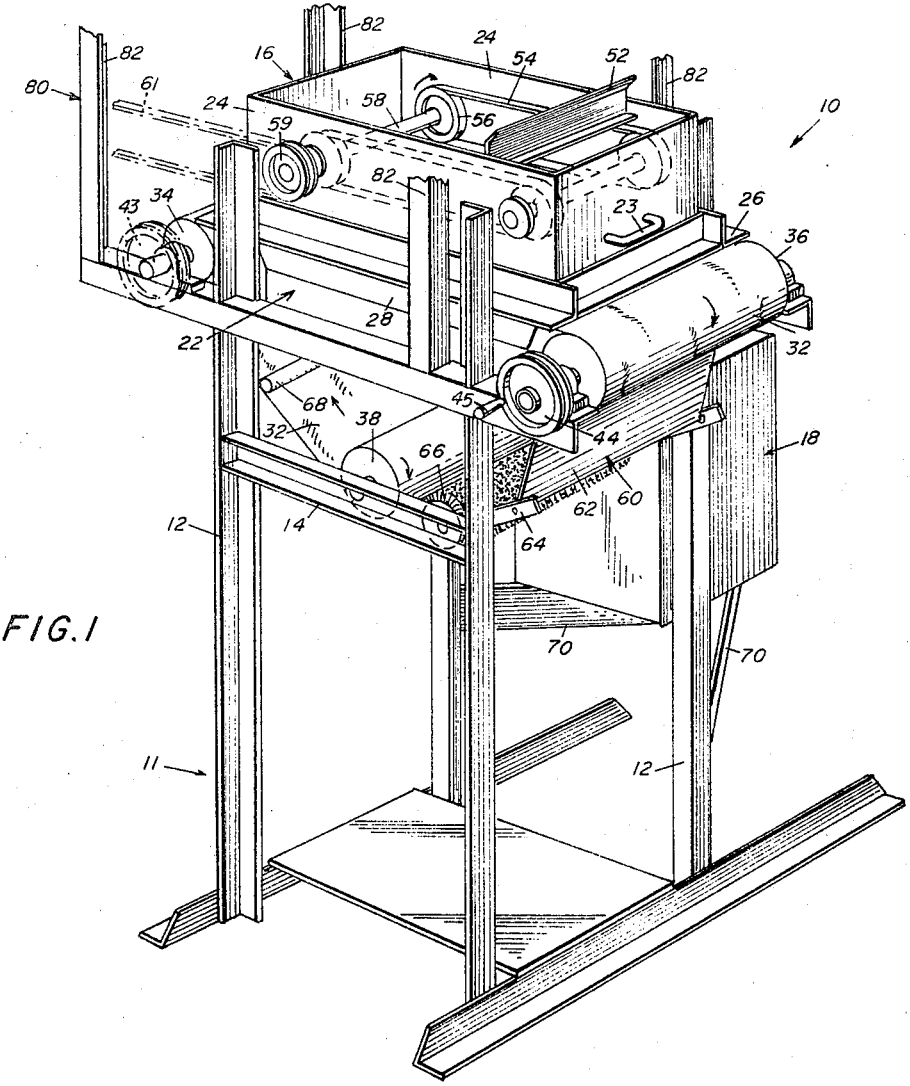
Figure 2:
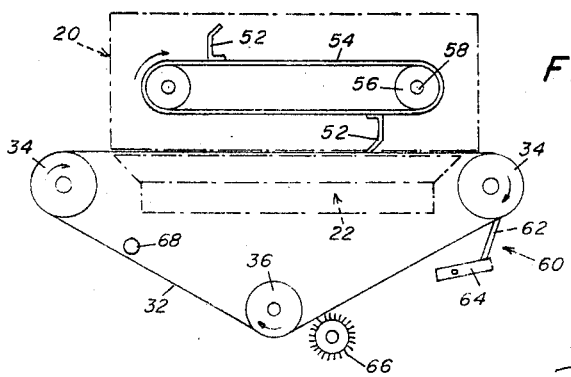
Figure 3:
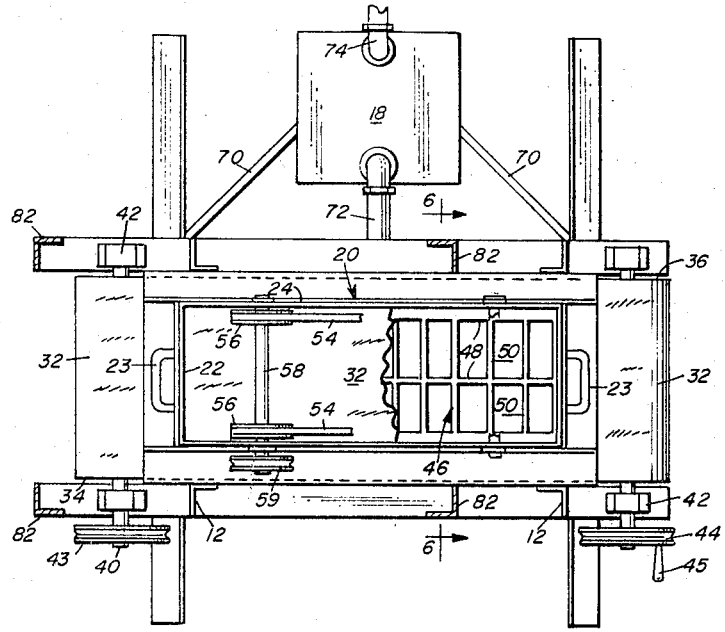
Figure 6:
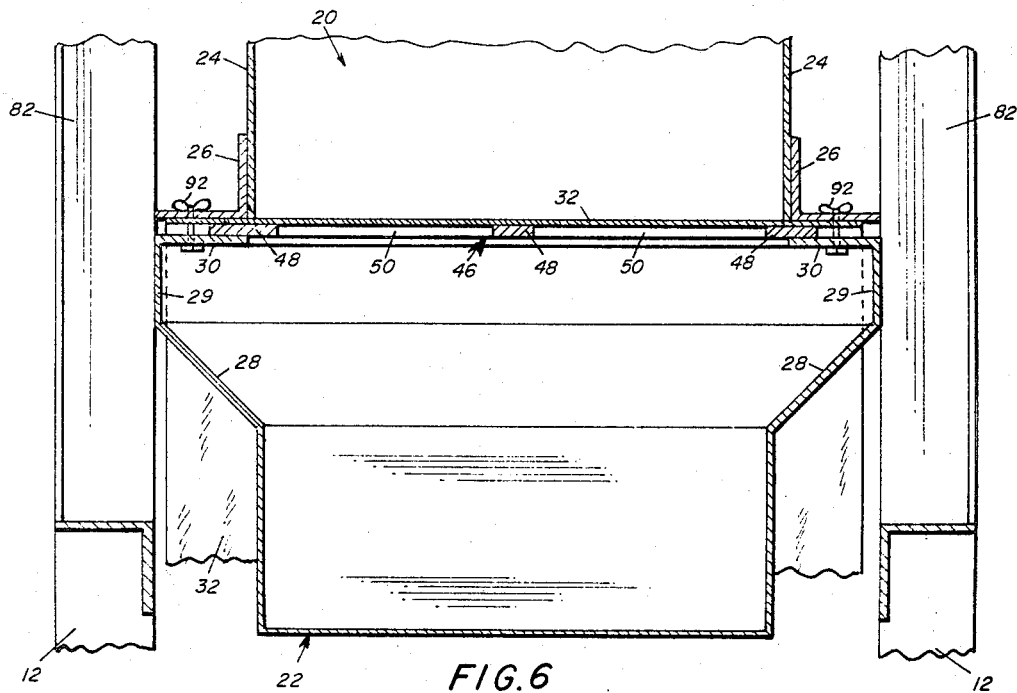
Figure 4:
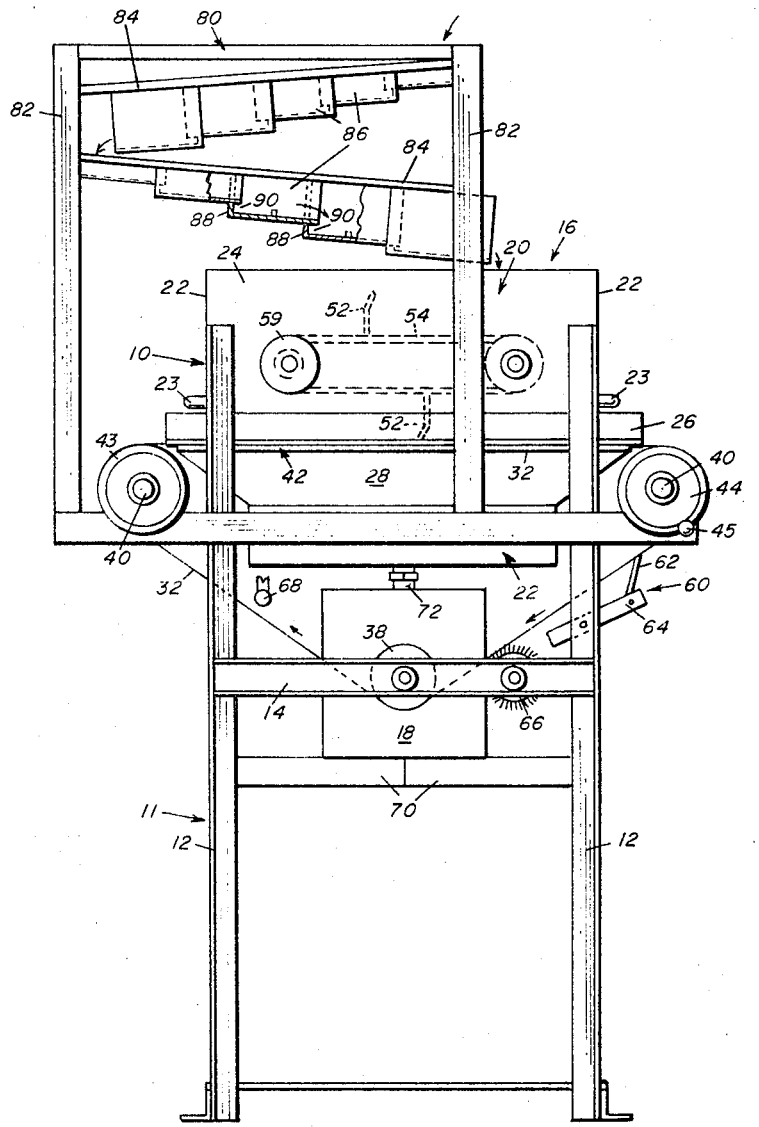
Figure 5:
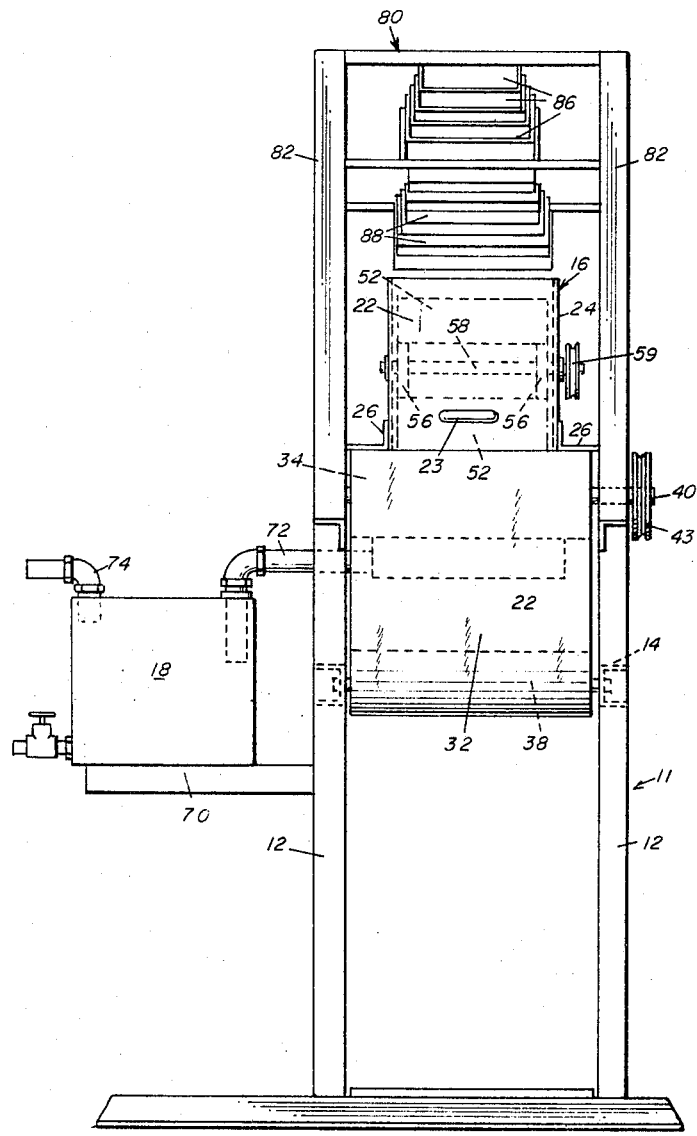

These and other objects of the invention will become more apparent to those skilled in the art by reference to the following detailed description when viewed in light of the accompanying drawings, wherein like elements throughout the figures thereof are indicated by like numerals and wherein:

FIGURE 1 is a perspective view of the apparatus;
FIGURE 2 is a diagrammatic view of the filter cleaning system;
FIGURE 3 is a plan view partly in section of the apparatus of FIGURE 1;
FIGURE 4 is a front elevation view of the apparatus of FIGURE 3;
FIGURE 5 is a side elevational view of the apparatus of FIGURE 3; and
FIGURE 6 is an enlarged fragmentary sectional view of the apparatus of FIGURE 3 taken along the lines 6—6 thereof.

Referring to the drawings the numeral 10 indicates generally the filtering apparatus of the instant invention. The apparatus has a supporting framework 11 comprising legs 12 and cross members 14. The framework supports a filter tank 16 at its upper end and a storage container 18 at one side. The framework also supports a pre-filter superstructure 80.

The prefilter superstructure 80 has four vertical legs 82 rigidly secured at their lower end to the framework 11. The legs support two pairs of inclined rails 84 to which are secured a series of metal trough or conduit sections 86. Each trough section has its lower end nested within the next lower section. The side walls of each higher section are thus sealingly engaged within the sidewalls of each lower system while the bottom wall of each higher section is sealingly engaged against an upstanding end wall 88 located at the higher end of each lower section.

Because of the end wall 88 and the nested relation of the trough sections, a chamber 90 is formed at the upper end of each lower section. The chambers 28 serve as collecting points for impurities in the liquid to be filtered.

Cotton oil or other liquid to be filtered, is introduced to the highest end of the upper run of trough sections and flows by gravity through it and the lower run of trough sections. The heaviest impurities will naturally be located closest to the bottom layer of the flowing liquid and therefore will collect in the chambers 90. The liquid will thus be prefiltered before it reaches the filter tank 16.

As best seen in FIGURE 4, the filter tank 16 is comprised of two sections, an upper supply section 20 and a lower filtrate section 22. Referring to FIGURE 6, the upper section 20, preferably of rectangular cross section, has vertical side walls 24, the lower peripheral portion thereof having outwardly extending horizontal flanges 26. The lower section 22 has vertical side walls which flare upwardly and outwardly at their upper end as at 28 terminating in vertically extending upper wall segments 29. The top periphery of the wall segments 29 are provided with inwardly extending horizontal flanges 30. The two sets of flanges 26 and 30 provide transverse abutting surfaces between the upper and lower sections 20 and 22. The upper section 20 is mounted for vertical movement by lifting handles 23 into or out of clamping engagement with the lower section 22.

Interposed between the abutting flanges 26 and 30 is one run of an endless filter cloth or web 32. The cloth is mounted for rotary movement around three parallel rollers 34, 36 and 38. The two uppermost rollers 34 and 36 are disposed to provide a horizontal run for the filter cloth between the sections 20 and 22. As best seen in FIGURES 3 and 4, the rollers are mounted on a reduced diameter extension shaft 40 which is rotatably supported by journals 42. Pulleys 43 and 44 are rigidly secured to the end of the shafts 40 of the rollers 34 and 36 respectively. The pulley 43 is connected to a belt and motor means (not shown) for filter cloth movement while the pulley 44 has mounted thereon a handle 45 to provide manual movement of the filter cloth when required. Since only the horizontal portion of the cloth is operative to provide filtering during use, it is readily apparent that there must be provided some means to support the weight of the supply liquid from the section 20 thereon. To this end, a screen, generally indicated by the numeral 46 and best seen in FIGURES 3 and 6, is rigidly secured at its periphery to the flanges 30. The screen is preferably comprised of three longitudinal bars 48 with a plurality of intersecting transverse bars 50. It is to be noted that the bars 48 and 50 are relatively flat so that when the screen 46 is clamped between the flanges 30, the cloth 32 and flanges 26 respectively, the abutting surfaces will seal against leakage. The screen itself performs no filtering function and is only used as a support for the filter cloth. The only requisite thereof is that the screen openings must be large enough so as not to interfere with the filtering operation.

In order to clean the filter deposits from the cloth during and after use, an arrangement, schematically shown in FIGURE 2, is provided. A pair of transverse scraper blades 52 are fixedly mounted on a pair of transversely spaced belts disposed so that the blades will remove deposits and clean substantially the entire width of the top surface of the cloth 40 during the filtering operation. Each belt is mounted on a pair of pulleys 56 which in turn are rigidly secured to shafts 58, rotatably mounted in opposed side walls 24 (FIGURE 1). One of the shafts 53 extends through the side wall and supports a pulley 59 which is driven by conventional power means through a belt 61, shown in phantom in FIGURE 1.

The filter cloth 32 is changed as follows: when the charge of liquid to be filtered has been processed, the upper section 20 is unclamped and the filter cloth moved clockwise about its rollers, either manually or otherwise, by actuation of the pulleys 43 and 44 as explained above. The first cleaning device encountered by the cloth is a scraper 60 having a flexible blade 62 and an adjustable support arm 64. Scrapers of this kind are well known in the art and in this invention are used for the first stage of cleaning in order to remove the bulk of the sludge or other debris collected on the cloth. The second cleaning device encountered by the filter cloth 32 is a roller brush 66 which is suitably powered to rotate clockwise, thus resisting filter cloth movement and thereby more effectively cleans the cloth. The last cleaning device encountered is a pneumatic tube 68, mounted within the area defined by the belt. The tube 68 has a plurality of apertures (not shown) for directing pressurized air through the cloth. Although the scraper and the brush contact the outer surface of the cloth, the pneumatic tube, located on the opposite side thereof, effectively blows out particles still clinging thereto. The source of pressurized air has not been shown, but is conventional and deleted for purposes of clarity.

As best seen in FIGURE 5, the storage container 18 is mounted on supporting arms 70 rigidly secured to the framework of the filter assembly. It should be noted that the storage container 18 is not open to the atmosphere and is at a lower height on the framework than the filter tank 16. A pipe 72 extending horizontally from the tank 22, communicates the lower end of the filtrate section 22 with the container 18. The storage container 50 communicates, through a pipe 74, to a suction pump (not shown).

In operation, the empty upper section 28 is moved upwardly, out of clamping engagement with the flanges 30, so that the filter cloth 32 may be rotated on the roller system to properly position a clean portion of filter cloth therebeneath. The upper section 20 is then lowered into clamping engagement with the filter cloth 32, the screen 46 and the flanges 30 of the lower section 22 and is filled with liquid to be filtered. Suction is then applied to partially evacuate the storage container 18 while the scrapers 52 are actuated to keep the filter relatively clear of debris. Atmospheric pressure acting upon the top surface of the liquid in the upper section 20, due to the partial vacuum beneath the filter cloth will thereby aid flow of the fluid downwardly through the filter cloth and into the storage container.

This invention thereby provides a filtering apparatus which utilizes a continuous web filter media in such a manner that the filter media may be quickly changed, reprocessed, cleaned and subsequently reused with maximum of efficiency and a minimum of complexity. The invention also provides means in the form of the scraper blades 52 to agitate and continually sweep the filter media during its operative cycle so that the filter media will not prematurely load up. The invention further provides means in the form of the vacuum system to accelerate the filtration of fluid through the filtering media to thereby provide a filtering apparatus of more utility and efficiency then heretofore available.

Note that clamping means 92 are provided between flanges 26 and 30 to insure a proper seal. The edges of the filter act on the gasket therefor.

As shown in FIGURE 5, the storage container 18 communicates the pipe 72 with the evacuator source 74. The container 18 is always emptied prior to the fluid reaching the level of the bottom of pipe 72.

What has been set forth above is intended primarily as exemplary to enable those skilled in the art in the practice of the invention and it should therefore be understood that, within the scope of the appended claims, the invention may be practiced in other ways than as specifically described.

What is new and therefore desired to be protected by Letters Patent of the United States is:

1. A fluid filtering apparatus comprising
   a filtering container,
   an endless web filter, a first portion of said web traversing the interior of said container to divide said container into first and second compartments,
   stationary perforated support means positioned between said compartments underlying and supporting said first portion of said web,
   means to move said web with respect to said container comprising a plurality of rollers supporting said web and means to drive at least one of said rollers,
   an opening in one wall of said container communicating with said first compartment,
   movable internal agitating and cleaning means disposed entirely in the first compartment of said container to sweep said first portion of said web, said means comprising a plurality of scraper blades secured to an endless belt rotatably mounted in said first compartment,
   said first and second compartments being mounted for movement into and out of a normally sealingly cooperative relation with each other clamping said first portion therebetween,
   external cleaning means mounted exteriorly of said container for cleaning the portion of said web adjacent said first portion,
   prefiltering means disposed above said container for prefiltering said fluid, and
   suction means for imposing a partial vacuum to said second chamber.

2. The apparatus of claim 1 further including a storage container in communication with said second compartment for collecting filtrate.

3. The apparatus of claim 2 wherein the storage container is positioned between said suction means and said second compartment and forms a passageway between said suction means and said second compartment.

4. The invention as described in claim 1 wherein said prefiltering means comprises a plurality of downwardly sloped channel sections with the lower end of each higher section nested within the upper end of each lower section.

References Cited

UNITED STATES PATENTS

| 60,445 | 12/1866 | Vander Weyde | 210—255 |
| 836,078 | 11/1906 | Bache-Wüg | 210—408 |
| 2,982,412 | 5/1961 | Hirs | 210—401 X |
| 3,190,451 | 6/1965 | Holland | 210—401 X |

REUBEN FRIEDMAN, Primary Examiner

T. A. GRANGER, Assistant Examiner

U.S. Cl. X.R.

210—262, 396, 401